(12) United States Patent
Gottlieb et al.

(10) Patent No.: US 10,623,369 B2
(45) Date of Patent: Apr. 14, 2020

(54) DEVICE AND METHOD FOR DISCOVERY AND ANNOUNCEMENT OF SECONDARY END-POINT REACHABILITY INFORMATION

(71) Applicant: Charter Communications Operating, LLC, St. Louis, MO (US)

(72) Inventors: Erez Jordan Gottlieb, Denver, CO (US); William Russell Armstrong, IV, Castle Rock, CO (US); Aakash Sahai, Centennial, CO (US)

(73) Assignee: Charter Communications Operating, LLC, St. Louis, MO (US)

(*) Notice: Subject to any disclaimer, the term of this patent is extended or adjusted under 35 U.S.C. 154(b) by 177 days.

(21) Appl. No.: 15/794,608

(22) Filed: Oct. 26, 2017

(65) Prior Publication Data
US 2019/0081925 A1 Mar. 14, 2019

Related U.S. Application Data

(60) Provisional application No. 62/557,978, filed on Sep. 13, 2017.

(51) Int. Cl.
| H04L 29/12 | (2006.01) |
| H04L 12/841 | (2013.01) |
| H04L 12/717 | (2013.01) |
| H04L 12/751 | (2013.01) |

(52) U.S. Cl.
CPC .......... *H04L 61/2567* (2013.01); *H04L 45/02* (2013.01); *H04L 45/42* (2013.01); *H04L 47/286* (2013.01); *H04L 61/103* (2013.01); *H04L 61/2015* (2013.01); *H04L 61/6022* (2013.01); *H04L 61/2076* (2013.01)

(58) Field of Classification Search
None
See application file for complete search history.

(56) References Cited

U.S. PATENT DOCUMENTS

| 7,020,796 | B1* | 3/2006 | Ennis | H04L 1/22 |
| | | | | 714/4.1 |
| 7,698,438 | B1* | 4/2010 | Shen | H04L 45/02 |
| | | | | 709/228 |
| 8,656,026 | B1* | 2/2014 | Prasad | H04L 67/22 |
| | | | | 709/217 |
| 9,596,181 | B1* | 3/2017 | Goel | H04L 45/748 |
| 2003/0200311 | A1* | 10/2003 | Baum | H04L 29/12122 |
| | | | | 709/224 |
| 2006/0182038 | A1* | 8/2006 | Nalawade | H04L 45/02 |
| | | | | 370/252 |

(Continued)

*Primary Examiner* — Noel R Beharry
*Assistant Examiner* — Richard Schnell
(74) *Attorney, Agent, or Firm* — The Marbury Law Group, PLLC

(57) ABSTRACT

Systems, methods, and devices of the various embodiments may enable discovery and announcement of secondary end-point reachability information in communication networks. Various embodiments may provide an intermediate IP routing system that may identify and advertise a mapping of a static IP address as reachable via a dynamic IP address assigned to an end-point (e.g., a computing device) in a communication network. Various embodiments provide systems, methods, and devices for advertising static IP address mapping in an IP network.

18 Claims, 7 Drawing Sheets

(56) References Cited

U.S. PATENT DOCUMENTS

| | | | |
|---|---|---|---|
| 2013/0201909 A1* | 8/2013 | Bosch | H04W 40/36 370/328 |
| 2015/0103839 A1* | 4/2015 | Chandrashekhar | H04L 45/741 370/401 |
| 2016/0072669 A1* | 3/2016 | Saavedra | H04L 12/2867 709/220 |

* cited by examiner

DEVICE AND METHOD FOR DISCOVERY AND ANNOUNCEMENT OF SECONDARY END-POINT REACHABILITY INFORMATION

RELATED APPLICATIONS

This application claims the benefit of priority to U.S. Provisional Patent Application 62/557,978 entitled "Device and Method for Discovery and Announcement of Secondary End-Point Reachability Information," filed Sep. 13, 2017, the entire contents of which are hereby incorporated by reference for all purposes.

BACKGROUND

Internet Protocol (IP) addresses identify the interfaces that computing devices (also generally referred to as nodes) use to connect to a communication network. Examples of IP addresses include 32 bit numbered addresses conforming to the IP Version 4 (IPv4) and 128 bit alphanumeric addresses conforming to the IP Version 6 (IPv6). An IP address enables IP packets to be routed to and from an interface of a computing device over a communication network.

IP addresses are assigned to the interfaces of computing devices by local Internet registries (LIRs), such as Internet service providers (ISPs). IP addresses can be either dynamic or static IP addresses. Dynamic IP addresses change over time, and an interface may receive a new dynamic IP address periodically, such as each time a computing device connects to the communication network. Static IP addresses are fixed and do not change, thereby allowing a computing device to reuse the same static IP address each time the computing device establishes an interface to the communication network.

To enable the use of a static IP address, the static IP address needs to be programmed into the networking equipment the computing device uses to establish the interface to the communication network, such as one or more modems and one or more routers used by the computing device to connect to the communication network. To support the permanent assignment of a static IP address to a single end-point (i.e., a computing device), in current communication networks a mapping of the static IP address according to an IP routing protocol is required at each node (e.g., each router) in the communication network as each node (e.g., each router) is only a priori provisioned with information for the networks attached to it directly.

IP routing protocols specify how routers communicate with each other, disseminating information that enables the routers to select routes between any number of nodes (e.g., routers, computing devices, etc.) on a communication network in order to reach a given end-point. In order for a node (e.g., router, end-point computing device, etc.) to be set to leverage a static IP address in current communication networks using current IP routing protocols, specialized software is required on both the sending and receiving node (e.g., router, end-point computing device, etc.). Further, current communication networks and current IP routing protocols require boutique (or node specific) configuration data in-order to accurately communicate and propagate secondary network information required to support static IP addresses. The addition and updating of the specialized software and per-node-set configuration data required by current communication networks and current IP routing protocols is difficult to maintain and operate at large scale. Additionally, the tracking and programming of static IP addresses to the various pieces of networking equipment required by current communication networks and current IP routing protocols entails large amounts of effort by network personnel and physical proximity to the various pieces of networking equipment themselves which is often difficult to achieve.

SUMMARY

The systems, methods, and devices of the various embodiments disclosed herein may enable discovery and announcement of secondary end-point reachability information in communication networks. Various embodiments disclosed herein may provide an intermediate IP routing system that may identify and advertise a mapping of a static IP address as reachable via a dynamic IP address assigned to an end-point (e.g., a computing device) in a communication network. Various embodiments provide systems, methods, and devices for advertising static IP address mapping in an IP network.

Further embodiments disclosed herein include a computing device having a processor configured with processor-executable instructions to perform operations of the methods summarized above. Further embodiments disclosed herein include a computing device including means for performing functions of the methods summarized above. Further embodiments disclosed herein include a non-transitory processor-readable storage medium having stored thereon processor-executable instructions configured to cause a computing device processor to perform operations of the methods summarized above. Further embodiments disclosed herein include a server configured with processor executable instructions to perform operations of the methods summarized above. Further embodiments disclosed herein include a server including means for performing functions of the methods summarized above. Further embodiments disclosed herein include a non-transitory processor-readable storage medium having stored thereon processor-executable instructions configured to cause a server processor to perform operations o of the methods summarized above.

BRIEF DESCRIPTION OF THE DRAWINGS

The accompanying drawings, which are incorporated herein and constitute part of this specification, illustrate exemplary embodiments, and together with the general description given above and the detailed description given below, serve to explain the features of various embodiments.

DETAILED DESCRIPTION

Figure 1:
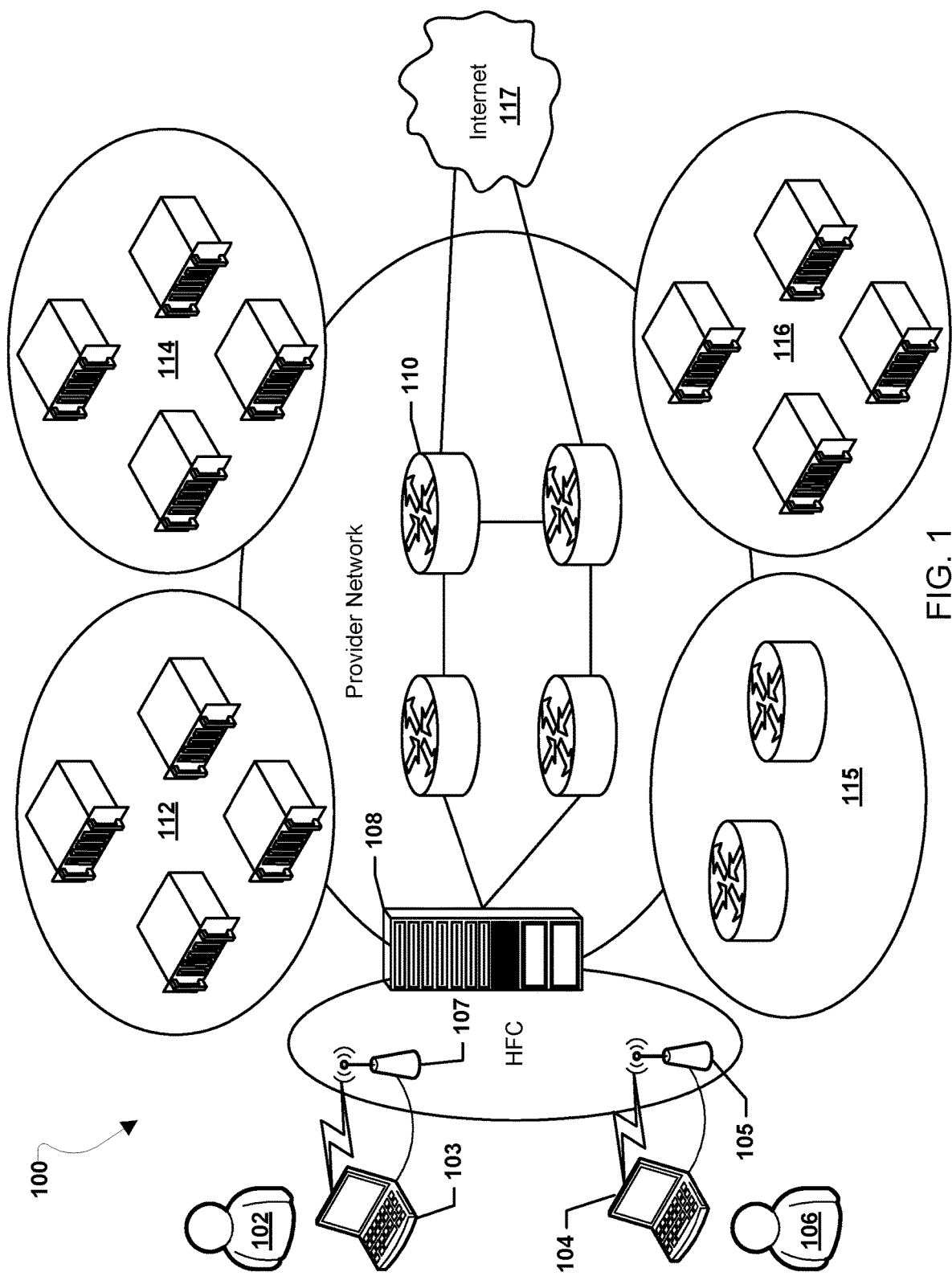
FIG. 1 is a communication system block diagram of an IP network suitable for use with various embodiments.

The various embodiments will be described in detail with reference to the accompanying drawings. Wherever possible, the same reference numbers will be used throughout the drawings to refer to the same or like parts. References made to particular examples and implementations are for illustrative purposes, and are not intended to limit the scope of the invention or the claims.

As used herein, the terms "computing device" and "node" are used interchangeably herein to refer to any one or all of satellite or cable set top boxes, laptop computers, rack mounted computers, routers, cable modem termination systems (CMTSs), cellular telephones, smart phones, personal or mobile multi-media players, personal data assistants (PDAs), personal computers, tablet computers, smart books, palm-top computers, desk-top computers, wireless electronic mail receivers, multimedia Internet enabled cellular telephones, wireless gaming controllers, streaming media players (such as, ROKU™), smart televisions, digital video recorders (DVRs), modems, and similar electronic devices which include a programmable processor and memory and circuitry for providing the functionality described herein.

The various embodiments are described herein using the term "server" to refer to any computing device capable of functioning as a server, such as communications server, a name server, a master exchange server, web server, mail server, document server, database server, route server, content server, or any other type of server. A server may be a dedicated computing device or a computing device including a server module (e.g., running an application which may cause the computing device to operate as a server). A server module (e.g., server application) may be a full function server module, or a light or secondary server module (e.g., light or secondary server application) that is configured to provide synchronization services among the dynamic databases on computing devices. A light server or secondary server may be a slimmed-down version of server-type functionality that can be implemented on a computing device thereby enabling it to function as a server only to the extent necessary to provide the functionality described herein.

In current communication networks, the provisioning of static IP addresses to computing devices requires a large amount of effort by network personnel in both the initial configuration of network equipment to support static IP addresses and the maintenance of the mapping of those static IP addresses during the operation of the communication network.

For example, in conventional communication networks, upon a customer ordering a static IP address service, a customer service request is sent to a network technician. The network technician must access one or more IP address management (IPAM) servers to procure an IPv4 static prefix allocation and prefix attachment allocation for use in creating the static IP address, configure the static prefix scope in one or more Dynamic Host Configuration protocol (DHCP) servers, and configure the customer facing static IP address allocation. Additionally, the network technician must configure the customer's customer premises equipment (CPE), such as the customer's cable modem/router used to connect to the communication network, with the static IP address and IPv4 static prefix allocations. These various configuration efforts for both network side and customer side equipment by the network technician can be labor intensive and time consuming in current communication networks.

Various embodiments disclosed herein may eliminate the need for network technicians to manually configure network and/or customer side equipment while enabling the use of static IP addresses. The systems, methods, and devices of the various embodiments may enable discovery and announcement of secondary end-point reachability information in communication networks. Various embodiments disclosed herein may provide an intermediate IP routing system that may identify and advertise a mapping of a static IP address as reachable via a dynamic IP address assigned to an end-point (e.g., a computing device) in a communication network, such as an IP network. Various embodiments disclosed herein may extend the Data Over Cable Service Interface Specification (DOCSIS) to enable the injection of a route identifying a static IP address as reachable via a dynamic IP addresses into a communication network operating according to the Border Gateway Protocol (BGP). In various embodiments, route injection of a route identifying a static IP address as reachable via a dynamic IP addresses may be performed by a processor of a lease processor server. Various embodiments may enable IPv4 and/or IPv6 static IP addresses to be reachable via IPv4 and/or IPv6 dynamic IP addresses. The various embodiments may enable static IP address allocations to follow customers and customer computing devices regardless of geography and to be independent of network attachment configuration or attachment nodes.

In various embodiments, a lease processor server may interface with a communication network. In various embodiments, a lease processor server may receive a static IP address registration request from another entity in the communication network, such as a business support system (BSS) server. The static IP address registration request may be a generated in response to a customer requesting a static IP address service. The static IP address registration request may identify a media access control (MAC) address of a customer's computing device for which the customer has ordered a static IP address to be assigned. Additionally, the static IP address registration may indicate a type of static IP address, such as IPv4, IPv6, etc., ordered, a prefix length for the static IP address, or any other type information related to the static IP address, MAC address, customer computing device, and/or customer account records.

In various embodiments, the lease processor server may associate one or more static IP address to one or more MAC address based at least in part on the static IP address registration request. For example, the lease processor server may associate a static IP address with a MAC address in response to receiving the static IP address registration request. In various embodiments, associating one or more static IP address to one or more MAC address may include controlling an IPAM server to auto-allocate a static IP address prefix for a customer account. For example, the lease processor server may control the IPAM server to auto-allocate a static IP address prefix by sending a message directing the IPAM server to allocate the requested length IPv4 and/or IPv6 prefix. In various embodiments, associating one or more static IP address to one or more MAC address may further include storing a record in a memory available to the lease processor server indicating an association between the one or more MAC addresses indicated in the static IP address registration request and the one or more static IP addresses allocated by the lease processor server.

In various embodiments, a lease processor may monitor dynamic IP address events in the communication network. As an example, a lease processor may monitor DHCP lease event announcements generated by DHCP servers in response to the DHCP servers assigning a dynamic IP address to a computing device (or node), such as a dynamic IP address assigned to a customer's computing device. As other examples, a lease processor may monitor system logs at a system log (SYSLOG) server tracking events in the communication network, a lease processor may monitor Internet Protocol Detail Records (IPDRs) stored by a IPDR collector server as part of BSS operations in a communication network, a lease processor may monitor flow records generated by an IPFIX collector or netflow server, and/or a lease processor may monitor Address Resolution Protocol (ARP) tables used in the communication network. In various embodiments such monitored dynamic IP address events may indicate various type events, such as lease events, release events, etc., have occurred and may indicate both a MAC address of a computing device and a dynamic IP address associated with that MAC address.

In various embodiments, a lease processor may determine whether a dynamic IP address event for a MAC address associated with a static IP address is received. For example, a MAC address may be associated with a static IP address in a memory available to a lease processor. In various embodiments, an IPAM server may have auto-allocated a static IP address prefix for one or MAC addresses of a customer account and the lease processor may compare the MAC addresses indicated in dynamic IP address events to MAC addresses associated with static IP addresses in a memory available to the lease processor to determine whether a dynamic IP address event for a MAC address associated with a static IP address is received.

In various embodiments, a lease processor may determine one or more dynamic IP addresses assigned to a MAC address associated with a static IP address based at least in part on the dynamic IP address event. In various embodiments, dynamic IP address events may indicate a dynamic IP address assigned to (or associated with) the MAC address determined by the lease processor to be associated with a static IP address. In this manner, the lease processor may determine a mapping between a pre-assigned static IP address and a newly assigned dynamic IP address via a common association to the same MAC address. Additionally, in various embodiments, a lease processor may determine a last static IP address announcement, such as the last static IP address announcement associated with the MAC address indicated in the dynamic IP address event. Static IP address announcements may be stored in lease announcement databases, such as lease processor announcement records databases or servers. The lease announcement databases may be accessible data stores from which network entities, such as lease processors or other network equipment, may fetch static IP address announcements. The last static IP address announcement entry in the lease announcement database may reflect the last association between a static IP address and a dynamic IP address that occurred.

In various embodiments, a lease processor may determine a type of the dynamic IP address event. In various embodiments, dynamic IP address events may indicate various a type event that resulted in the generation of the dynamic IP address events, such as lease events, release events, etc. As examples, lease events may be events in which a static IP address is associated with a dynamic IP address for a period of time and release events may be events in which a static IP address is disassociated with a dynamic IP address (e.g., the dynamic IP address is released, expires, etc.). The type of the dynamic IP address event may control how the dynamic IP address event is handled by the lease processor in various embodiments. For example, in response to the type of dynamic IP address event being determined to be a release event, the lease processor may send a withdraw notification for the static IP address and last dynamic IP address. The withdraw notification may be sent to a route injector and the lease processor may delete the last static IP address announcement from the lease announcement database. As another example, in response to the type of dynamic IP address event being determined to be a lease event, the lease processor may send a static IP address announcement for the static IP address and current dynamic IP address. The static IP address announcement may be sent to a route injector and the lease processor may add a static IP address announcement to the lease announcement database thereby creating a new last static IP address announcement. As a further example, in response to the type of dynamic IP address event being determined to not be a release event (e.g., any other type event, lease, etc.), the lease processor may determine whether there is a conflict between a current address and a last address. A conflict may arise when the current dynamic IP address differs from the dynamic IP address listed in the last static IP address announcement. This difference in dynamic IP addresses may indicate that the lease processor missed a static IP address event or change in dynamic IP address. To prevent routing of packets to the lease processor may send a withdraw notice to a route injector.

In various embodiments, the association between a static IP address and dynamic IP address may be governed by a time-to-live (TTL) counter. Concurrently with sending a static IP address announcement, the lease processor may record a timestamp of the lease notification and starting the TTL counter. Upon expiration of the TTL counter (e.g., a preset amount of time in seconds), the lease processor may send a withdraw notification for the static IP address and last dynamic IP address.

In various embodiments, in response to receiving a withdraw notice and/or a static IP address announcement, a route injector may update the routing information in one or more route reflector for the network, for example via a BGP update. The BGP update may correlate the MAC address, dynamic IP address, and static IP address together in the routing tables as reachable when a lease event occurs. The BGP update may disassociate the MAC address, dynamic IP address, and static IP address in the routing tables when a withdraw event occurs. By correlating the MAC address, dynamic IP address, and static IP address together in the routing tables as reachable, the lease processor may leverage a path-vector routing protocol through the route injector that advertises the static IP address allocation as a "next-hop" address of the dynamic IP address.

Various examples of different protocols are discussed herein, such as IPv4, IPv6, DHCP, DOCSIS, and BGP. The discussions of specific protocols, such as IPv4, IPv6, DHCP, DOCSIS, and BGP, are provided merely as examples to better illustrate the aspects of the various embodiments, and are not intended to limit the various embodiments in any way. Other protocols may be used with the various embodiments, and the other protocols may be substituted in the various examples without departing from the spirit or scope of the invention.

FIG. 1 illustrates an IP network 100 suitable for use with various embodiments. The IP network 100 may include multiple devices, such as customer computing devices 103, 104, CPEs 105, 107 (e.g., cable modems/routers), CMTS 108, one or more provider network routers 110, one or more provisioning servers 112, one or more route reflectors 115, one or more back office and portal servers 116, and one or more lease processor servers and route injector servers 114. The customer computing devices 103, 104 may exchange data via one or more wired or wireless connections with the CPEs 105, 107. The CPEs 105, 107 may be connected via network, such as a hybrid fiber-coaxial (HFC) network, to the CMTS 108 which may exchange data via the network with the CPEs 105, 107. The CMTS 108 may enable data to be exchanged between the customer computing devices 103, 104, CPEs 105, 107, and the various devices of the provider network, such as one or more provider network routers 110, one or more provisioning servers 112, one or more route reflectors 115, one or more back office and portal servers 116, and one or more lease processor servers and route injector servers 114. Via the CMTS 108 connections to the one or more provider network routers 110 and the one or more provider network routers' 110 connections to the Internet 117, Internet service may be provide to the customer computing devices 103, 104. In various embodiments, the IP network 100 may operate according to the DOCSIS. In various embodiments, the one or more provisioning servers 112, one or more route reflectors 115, one or more back office and portal servers 116, and/or one or more lease processor servers and route injector servers 114 may exchange data with another via the one or more provider network routers 110 and/or via other connections (not shown).

In various embodiments, the customer computing devices 103, 104 may be uniquely identified by their respective MAC addresses. In various embodiments, the customer computing devices 103, 104 may be assigned dynamic IP addresses, such as dynamic IPv4 and/or IPv6 addresses, each time the customer computing devices 103, 104 connect to the CPEs 105, 107 and/or CMTS 108. In various embodiments, the customer computing devices 103, 104 and/or the customers 102, 106 may also be associated with the selection of a static IP address services by the customers 102, 106. Various embodiments may enable static IP addresses, such as IPv4 and/or IPv6 static IP addresses, associated with the customer computing devices 103, 104 and/or the customers 102, 106 to be reachable via dynamic IP addresses, such as IPv4 and/or IPv6 dynamic IP addresses. The various embodiments may enable static IP address allocations to follow customers 102, 106 and customer computing devices 103, 104 regardless of geography and to be independent of network attachment configuration or attachment nodes (e.g., CPEs 105, 107, CMTS 108, etc.).

In various embodiments, the one or more provisioning servers 112 may be various different types of servers, such as registrar servers (e.g., Cisco® Network Registrar (CNR) servers), Regional Distribution Unit (RDU) servers, DHCP servers, IPAM servers, SYSLOG servers, etc. In various embodiments, the one or more route reflectors 115 may be servers configured to learn new routes and deploy them across the provider network via various protocols, such as BGP. In various embodiments, the one or more back office and portal servers 116 may be various different type servers, such as BSS servers, IPDR collector servers, etc., that provide interfaces for customers 102, 106 to modify their service via their respective computing devices 103, 104 to enable features, such as static IP address assignments. In various embodiments, the one or more lease processor servers and route injector servers 114 may be various different type servers configured to learn about dynamic IP address leases (e.g., DHCP leases), for example from the one or more provisioning servers 112. Additionally, the one or more lease processor servers and route injector servers 114 may announce associations between dynamic IP addresses and static IP address for a customer computing device 103, 104 to the one or more route reflectors 115. The one or more lease processor servers and route injector servers 114 may also store and manage one or more lease announcement database storing various data, such as associations between static IP addresses and dynamic IP address, prefixes assigned to static IP address, etc.

Figure 2:
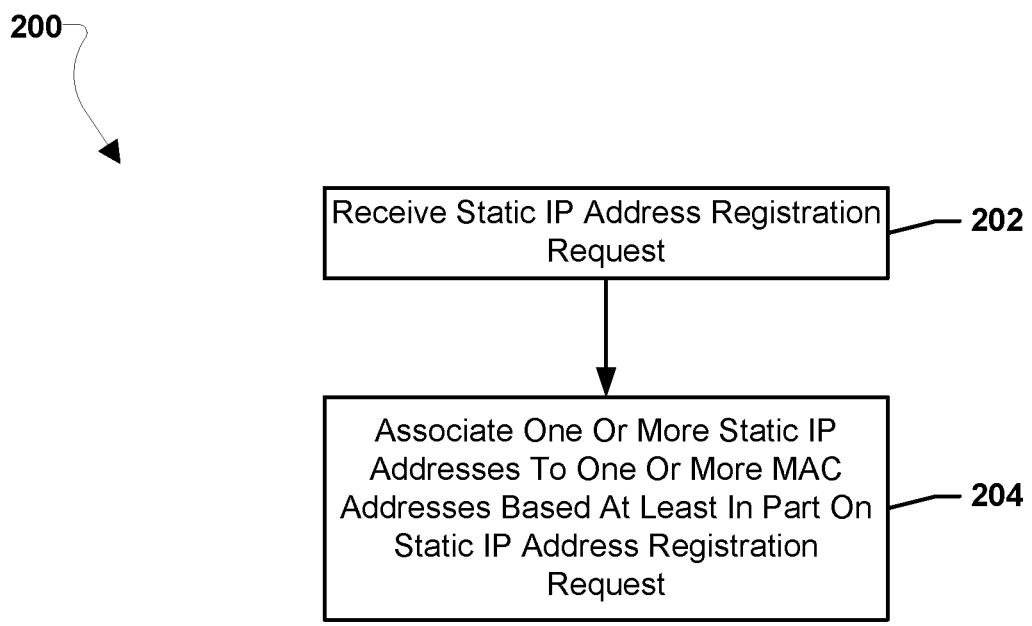
FIG. 2 is a process flow diagram illustrating an embodiment method for associating static IP address to MAC addresses.

FIG. 2 illustrates an embodiment method 200 for associating static IP address to MAC addresses. In various embodiments, the operations of method 200 may be performed by a server in an IP network, such as a lease processor 114 in IP network 100.

With reference to FIGS. 1 and 2, in block 202 the lease processor may receive a static IP address registration request. In various embodiments, a lease processor server may receive a static IP address registration request from another entity in the communication network, such as a BSS server. The static IP address registration request may be a generated in response to a customer requesting a static IP address service. The static IP address registration request may identify a MAC address of a customer's computing device for which the customer has ordered a static IP address to be assigned. Additionally, the static IP address registration may indicate a type of static IP address, such as IPv4, IPv6, etc., ordered, a prefix length for the static IP address, or any other type information related to the static IP address, MAC address, customer computing device, and/or customer account records.

In block 204, the lease processor may associate one or more static IP addresses to one or more MAC addresses based at least in part on the static IP registration request. For example, the lease processor server may associate a static IP address with a MAC address in response to receiving the static IP address registration request. In various embodiments, associating one or more static IP address to one or more MAC address may include controlling an IPAM server to auto-allocate a static IP address prefix for a customer account. For example, the lease processor server may control the IPAM server to auto-allocate a static IP address prefix by sending a message directing the IPAM server to allocate the requested length IPv4 and/or IPv6 prefix. In various embodiments, associating one or more static IP address to one or more MAC address may further include storing a record in a memory available to the lease processor server indicating an association between the one or more MAC addresses indicated in the static IP address registration request and the one or more static IP addresses allocated by the lease processor server.

Figure 3:
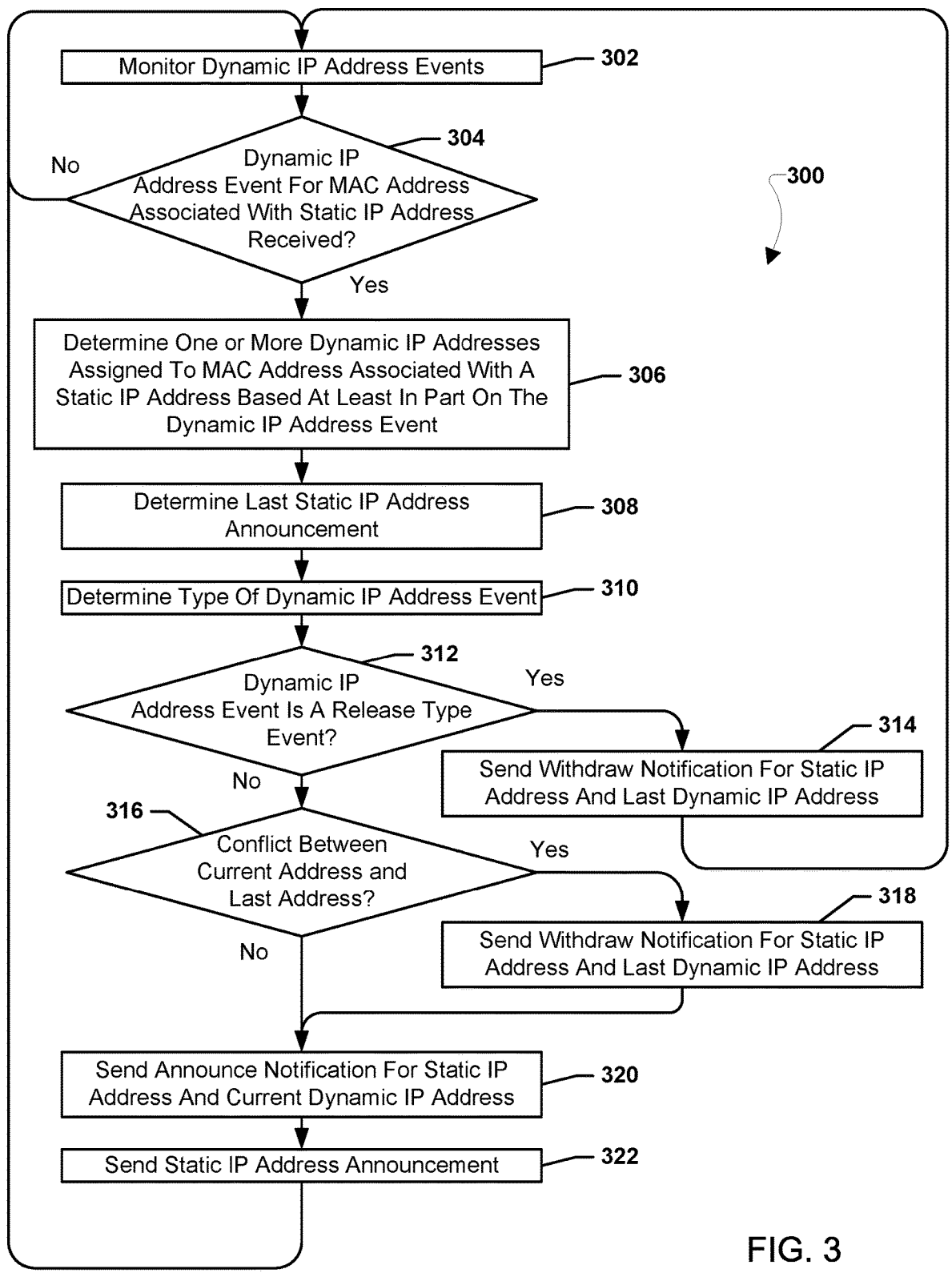
FIG. 3 is a process flow diagram illustrating an embodiment method for advertising static IP address mapping.

FIG. 3 illustrates an embodiment method 300 for advertising static IP address mapping. In various embodiments, the operations of method 300 may be performed by a server in an IP network, such as a lease processor 114 in IP network 100. In various embodiments, the operations of method 300 may be performed in conjunction with the operations of method 200 described with reference to FIG. 2.

With reference to FIGS. 1-3, in block 302 the lease processor may monitor dynamic IP address events. In various embodiments, a lease processor may monitor dynamic IP address events in the IP network. As an example, a lease processor may monitor DHCP lease event announcements generated by DHCP servers in response to the DHCP servers assigning a dynamic IP address to a computing device (or node), such as a dynamic IP address assigned to a customer's computing device. As other examples, a lease processor may monitor system logs at a system log (SYSLOG) server tracking events in the communication network, a lease processor may monitor Internet Protocol Detail Records (IPDRs) stored by a IPDR collector server as part of BSS operations in a communication network, a lease processor may monitor flow records generated by an IPFIX collector or netflow server, and/or a lease processor may monitor Address Resolution Protocol (ARP) tables used in the communication network. In various embodiments such monitored dynamic IP address events may indicate various type events, such as lease events, release events, etc., have occurred and may indicate both a MAC address of a computing device and a dynamic IP address associated with that MAC address.

In determination block 304, the lease processor may determine whether a dynamic IP address event for a MAC address associated with a static IP address is received. For example, a MAC address may be associated with a static IP address in a memory available to a lease processor. In various embodiments, an IPAM server may have auto-allocated a static IP address prefix for one or MAC addresses of a customer account and the lease processor may compare the MAC addresses indicated in dynamic IP address events to MAC addresses associated with static IP addresses in a memory available to the lease processor to determine whether a dynamic IP address event for a MAC address associated with a static IP address is received.

In response to determining that a dynamic IP address event for a MAC address associated with a static IP address is not received (i.e., determination block 304="No"), the lease processor may continue to monitor dynamic IP address events in block 302.

In response to determining that a dynamic IP address event for a MAC address associated with a static IP address is received (i.e., determination block 304="Yes"), the lease processor may determine one or more dynamic IP addresses assigned to the MAC address associated with a static IP address based at least in part on the dynamic IP address event in block 306. In various embodiments, dynamic IP address events may indicate a dynamic IP address assigned to (or associated with) the MAC address determined by the lease processor to be associated with a static IP address. In this manner, the lease processor may determine a mapping between a pre-assigned static IP address and a newly assigned dynamic IP address via a common association to the same MAC address.

In block 308, the lease processor may determine a last static IP address announcement. Static IP address announcements may be stored in lease announcement databases, such as lease processor announcement records databases or servers. The lease announcement databases may be accessible data stores from which network entities, such as lease processors or other network equipment, may fetch static IP address announcements. The last static IP address announcement entry in the lease announcement database may reflect the last association between a static IP address and a dynamic IP address that occurred.

In block 310, the lease processor may determine a type of the dynamic IP address event. In various embodiments, dynamic IP address events may indicate various a type event that resulted in the generation of the dynamic IP address events, such as lease events, release events, etc. As examples, lease events may be events in which a static IP address is associated with a dynamic IP address for a period of time and release events may be events in which a static IP address is disassociated with a dynamic IP address (e.g., the dynamic IP address is released, expires, etc.). The type of the dynamic IP address event may control how the dynamic IP address event is handled by the lease processor in various embodiments.

In determination block 312, the lease processor may determine whether a dynamic IP address event is a release type event. In response to determining that the dynamic IP address event is a release type event (i.e., determination block 312="Yes"), the lease processor may send a withdraw notification for the static IP address and last dynamic IP address in block 314 and continue to monitor dynamic IP address events in block 302. The withdraw notification may be a withdraw notice sent to a route injector and the lease processor may delete the last static IP address announcement from the lease announcement database. The withdraw notice may indicate the MAC address, the current dynamic IP address, and the static IP address. The withdraw notice may enable the updating of the routing information in one or more route reflectors of the IP network via a BGP update being sent from the route injector to the one or more route reflectors of the IP network. The BGP update may disassociate the MAC address, the current dynamic IP address, and the static IP address in the routing tables.

In response to determining that the dynamic IP address event is a lease type event (i.e., determination block 312="No"), the lease processor may determine whether there is a conflict between the current address and the last address in determination block 316. A conflict may arise when the current dynamic IP address differs from the dynamic IP address listed in the last static IP address announcement. This difference in dynamic IP addresses may indicate that the lease processor missed a static IP address event or change in dynamic IP address.

In response to determining that there is a conflict (i.e., determination block 316="Yes"), the lease processor may send a withdraw notification for the static IP address and last dynamic IP address in block 318. To prevent routing of packets to the lease processor may send a withdraw notice to a route injector. The withdraw notification may be a withdraw notice similar to the withdraw notice discussed with reference to block 314.

Upon sending a withdraw notice in block 318 or in response to determining that there is not a conflict (i.e., determination block 316="No"), the lease processor may send an announce notification for the static IP address and current dynamic IP address in block 320. The announce notification may be sent to a route injector. The announce notification may correlate the MAC address, the current dynamic IP address, and the static IP address together. For example, the announce notification may enable the updating of the routing information in one or more route reflectors of the IP network. In response to the sending of the announce notification, BGP update may be sent from the route injector to the one or more route reflectors of the IP network. The BGP update may correlate the MAC address, the current dynamic IP address, and the static IP address together in routing tables of the IP network as indicated in the announce notification. In block 322, the lease processor may send a static IP address announcement and continue to monitor dynamic IP address events in block 302. The static IP address announcement may be added to the lease announcement database thereby creating a new last static IP address announcement.

Figure 4:
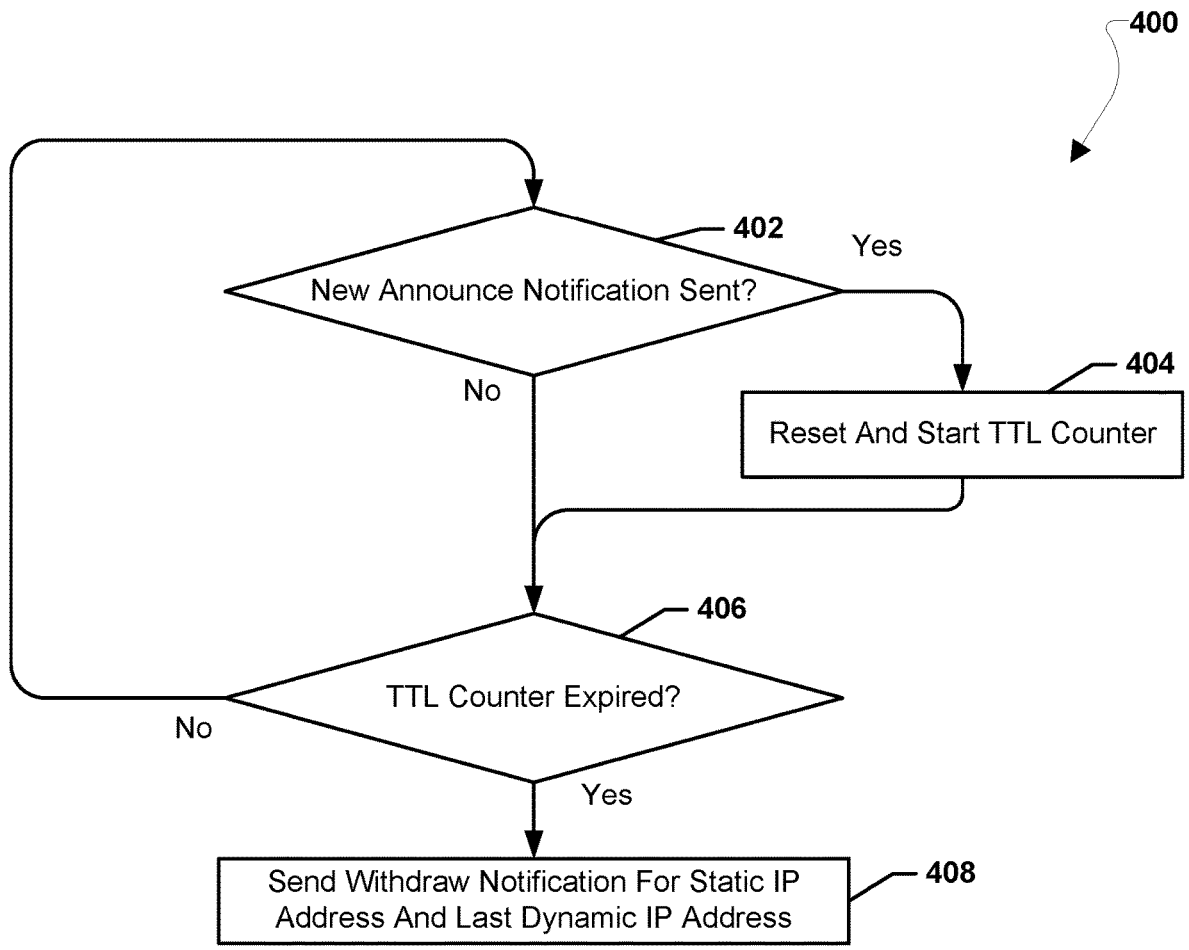
FIG. 4 is a process flow diagram illustrating an embodiment method for monitoring the time-to-live of static IP address mappings.

FIG. 4 illustrates an embodiment method 400 for monitoring the time-to-live (TTL) of static IP address mappings. In various embodiments, the operations of method 400 may be performed by a server in an IP network, such as a lease processor 114 in IP network 100. In various embodiments, the operations of method 400 may be performed in conjunction with the operations of methods 200 and 300 described with reference to FIGS. 2 and 3.

With reference to FIGS. 1-4, in determination block 402 the lease processor may determine whether a new announce notification was sent. In response to a new announce notification being sent (i.e., determination block 402="Yes"), in block 404 the lease processor may reset and start the TTL counter. The TTL counter may be a count up or countdown timer that tracks the expiration of a present amount of time (e.g., an amount of seconds) after which withdraw notices for static IP addresses and dynamic IP addresses mappings are to be sent by the lease processor. In this manner, stale or unused static to dynamic IP address mappings may be purged from the network routing tables.

Upon starting the TTL counter in block 404 or in response to no new announce notification being sent (i.e., determination block 402="No"), the lease processor may determine whether the TTL counter is expired in determination block 406. In response to the TTL counter not being expired (i.e., determination block 406="No"), the lease processor may continue to monitor for new announce notifications being sent in block 402. In response to the TTL counter expiring (i.e., determination block 406="Yes"), in block 408 the lease processor may send a withdraw notification for the static IP address and last dynamic IP address. The withdraw notification may be a withdraw notice similar to the withdraw notice discussed with reference to block 314 above.

Figure 5:
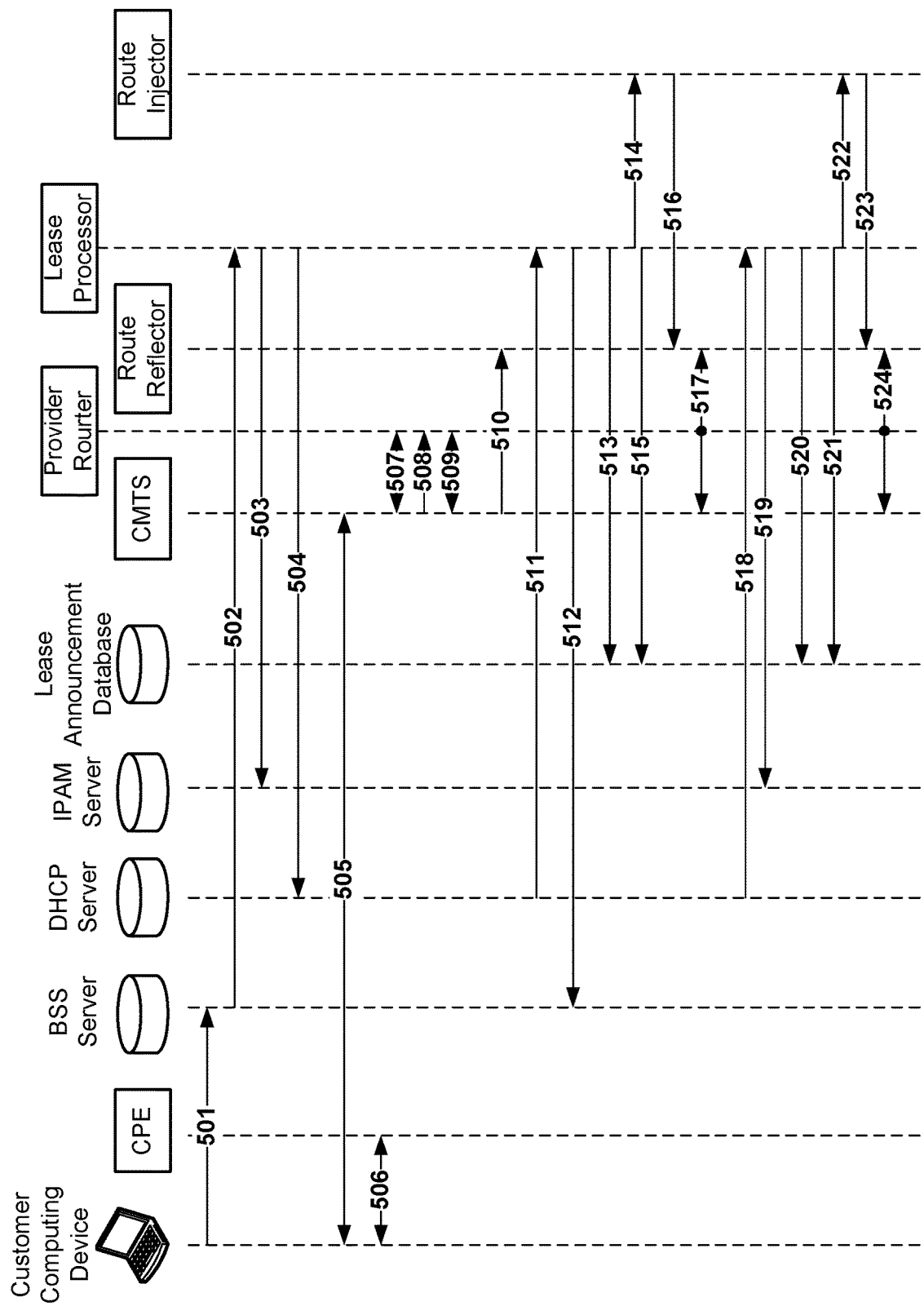
FIG. 5 is a call flow diagram illustrating interactions for advertising static IP address mappings in an IP network according to various embodiments.

FIG. 5 is a call flow diagram illustrating interactions for advertising static IP address mappings in an IP network according to various embodiments. The various interactions illustrated in FIG. 5 may be performed by various devices, such as those discussed above in IP network 100. In various embodiments, the interactions illustrated in FIG. 5 may be one or more operations of methods 200, 300, and/or 400 as described with reference to FIGS. 2-4.

In operation 501, a customer computing device may place a static IP address service order with a BSS server. In operation 502, the BSS server may register the CPE MAC address and requested prefix length with the lease processor. The requested prefix may be an IPv4 and/or IPv6 address of variable prefix length. In operation 503, the lease processor may allocate the requested length IPv4 and/or IPv6 prefix to the customer computing device's MAC at the IPAM server. In this manner, a static IP address prefix may be set aside for use by the customer computing device. The lease processor may monitor the DHCP server lease notification logs for lease events associated with the customer computer's MAC address or CPE in operation 504.

In operation 505, the customer computing device may be provisioned a network connection via DOCSIS provisioning and MAC adjacency provisioning operations with the CMTS resulting in a dynamic IP address being assigned to the customer computing device. The customer computing device may have communicated with the CMTS over a Wide Area Network (WAN) interface provided by the CPE in operation 506. Network operations to enable the routing of packets to the customer computing device may include the CMTS to provider router dynamic IP address and IP adjacency establishment in operation 507, thereby enabling the completion of a routing graph to the CPE endpoint. Network operations to enable the routing of packets to the customer computing device may also include the CMTS announcing its local prefixes used for dynamic allocation in operation 508 and the provider router and CMTS learning network layer reachability information in operation 509. Routing information for the customer computing device may be exchanged between the CMTS and route reflector in operation 510 via BGP.

The DHCP server may log the lease of a dynamic IP address assigned to the customer computing device and the MAC of the CPE and in operation 511, the lease processor may identify that that dynamic IP address was assigned to the customer computer's MAC address. In operation 512, the lease processor may fetch the subscriber static prefix(es) from the BSS server. In operation 513 the lease processor may fetch the last announcement from the lease announcement database. The last announcement may not be present in the lease announcement database when there is no active static IP and dynamic IP association.

When the dynamic address event is a lease event, the lease processor may send an announce notification with the static IP prefix and current dynamic IP address to the route injector in operation 514 and create an announcement entry in operation 515 at the lease announcement database. The route injector may send a BGP update to the route reflector in operation 516. In this manner, the lease processor through the route injector may identify and advertise a mapping of a static IP address as reachable via a dynamic IP address assigned to the customer computing device (i.e., an end-point) in an IP network. The route reflector may update the provider routers and the CMTS with the new association in operation 517, thereby enabling discovery and announcement of secondary end-point reachability information for the static IP assigned customer computing device.

A later dynamic address event may be a release event monitored in operation 518. In operation 519, the lease processor may fetch the subscriber static prefix(es) from the IPAM server. In operation 520 the lease processor may fetch the last announcement from the lease announcement database. Additionally, whether or not a later dynamic address event occurs, the TTL counter for the association between the static IP address and dynamic IP address may expire.

When the TTL counter expires or the later dynamic address event is a release event, the lease processor may send a withdraw notification with the static IP prefix and current dynamic IP address to the route injector in operation 522 and delete the last announcement entry in operation 521 at the lease announcement database. The route injector may send a BGP update to the route reflector in operation 523. In this manner, the lease processor through the route injector may identify and advertise a disassociation of a static IP address as and dynamic IP address assigned to the customer computing device (i.e., an end-point) in an IP network (e.g., may delete the secondary end-point reachability information associating the static IP address with the customer computing device). The route reflector may update the provider routers and the CMTS to remove the association in operation 524.

Figure 6:
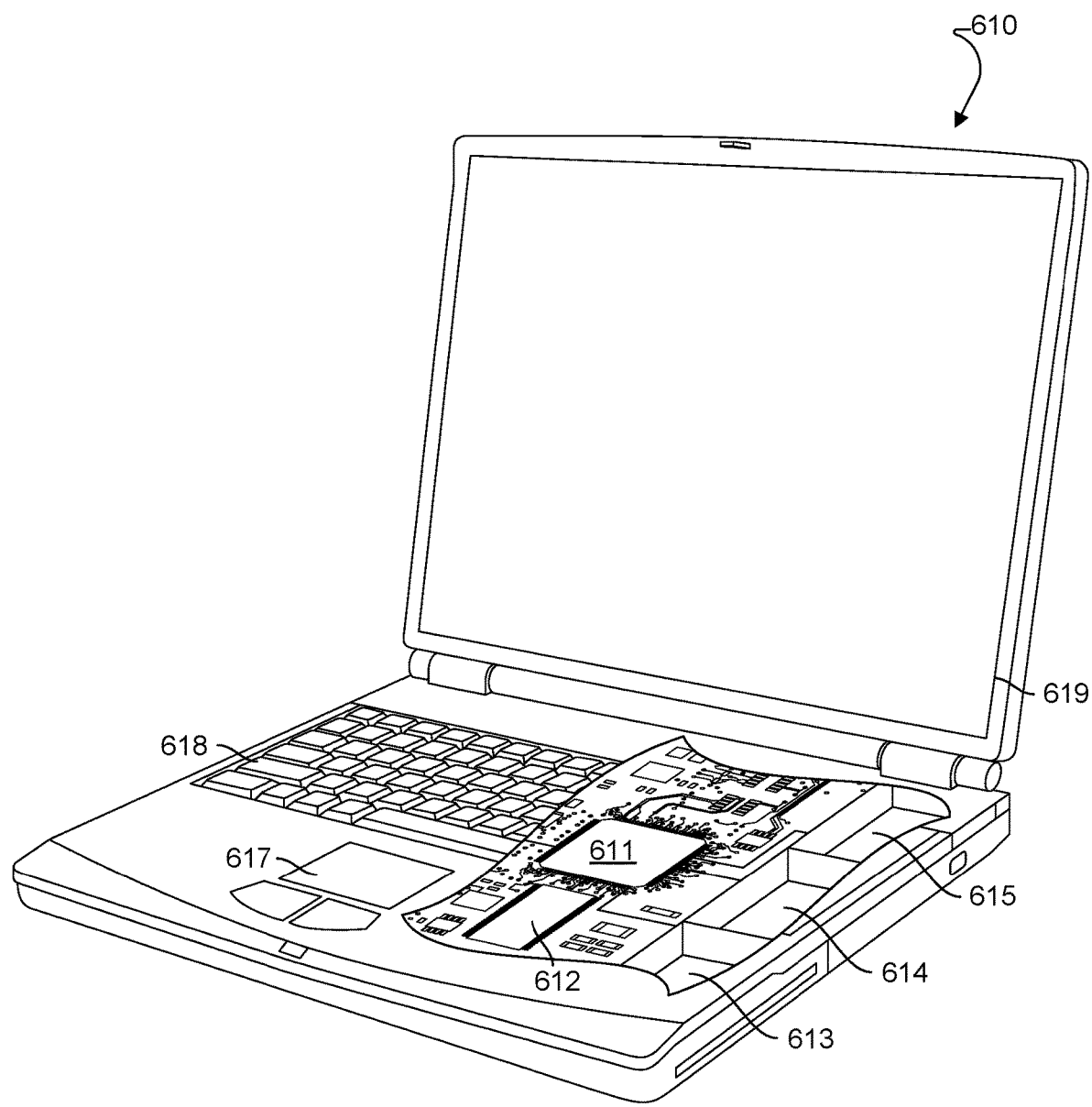
FIG. 6 is a component diagram of an example computing device suitable for use with various embodiments.

FIG. 6 is a component diagram of an example computing device suitable for use with various embodiments.

Various embodiments illustrated and described are provided merely as examples to illustrate various features of the claims. However, features shown and described with respect to any given embodiment are not necessarily limited to the associated embodiment and may be used or combined with other embodiments that are shown and described. Further, the claims are not intended to be limited by any one example embodiment. For example, one or more of the operations of the methods 200, 300, and 400 may be substituted for or combined with one or more operations of the methods 200, 300, and 400, and vice versa.

The various embodiments (including, but not limited to, embodiments discussed above with reference to FIGS. 1-5) described above may also be implemented within a variety of computing devices, such as a laptop computer 610 as illustrated in FIG. 6. Many laptop computers include a touch pad touch surface 617 that serves as the computer's pointing device, and thus may receive drag, scroll, and flick gestures similar to those implemented on mobile computing devices equipped with a touch screen display and described above.

A laptop computer 610 will typically include a processor 611 coupled to volatile memory 612 and a large capacity nonvolatile memory, such as a disk drive 613 of Flash memory. The laptop computer 610 may also include a floppy disc drive 614 and a compact disc (CD) drive 615 coupled to the processor 611. The laptop computer 610 may also include a number of connector ports coupled to the processor 611 for establishing data connections or receiving external memory devices, such as a USB or FireWire® connector sockets, or other network connection circuits (e.g., interfaces) for coupling the processor 611 to a network. In a notebook configuration, the computer housing may include the touchpad 617, the keyboard 618, and the display 619 all coupled to the processor 611. Other configurations of the computing device may include a computer mouse or trackball coupled to the processor (e.g., via a USB input) as are well known, which may also be used in conjunction with the various embodiments.

Figure 7:
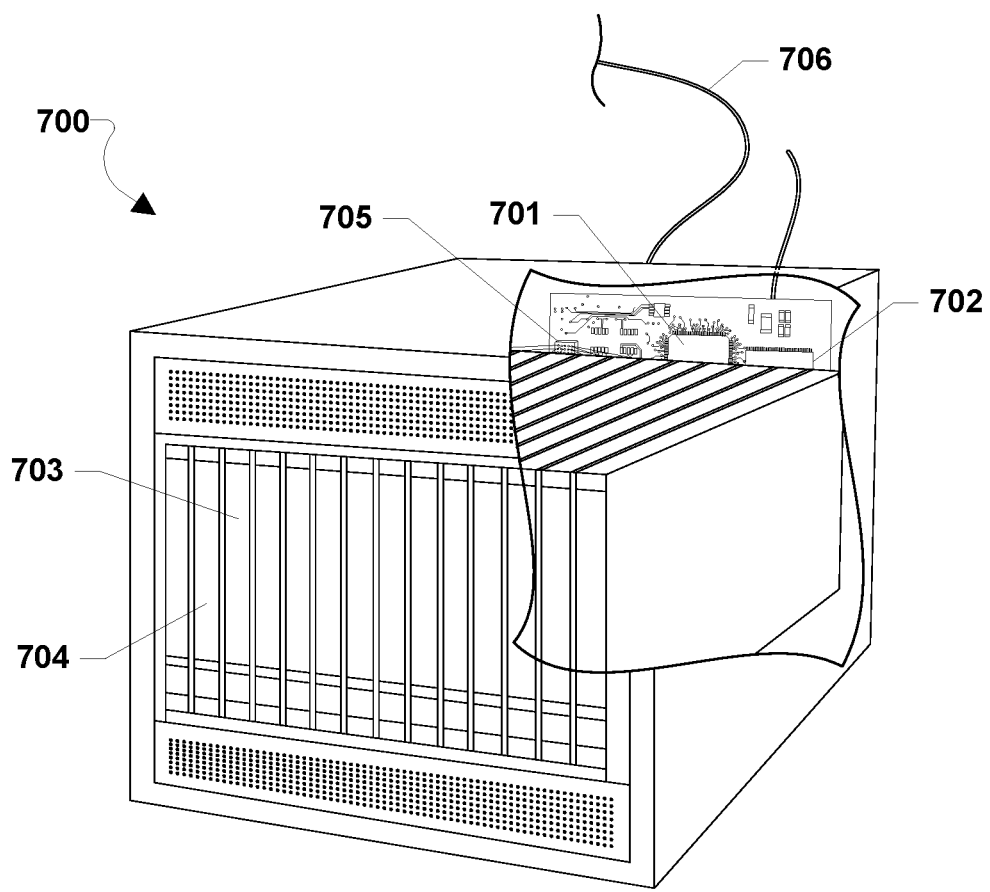
FIG. 7 is a component diagram of an example server suitable for use with the various embodiments.

Various embodiments (including, but not limited to, embodiments discussed above with reference to FIGS. 1-5) may be implemented on any of a variety of commercially available server devices, such as the server device 700 illustrated in FIG. 7. Such a server device 700 may include a processor 701 coupled to volatile memory 702 and a large capacity nonvolatile memory, such as a disk drive 703. The server device 700 may also include a floppy disc drive, compact disc (CD) or DVD disc drive 704 coupled to the processor 701. The server device 700 may also include network access ports 706 coupled to the processor 701 for establishing data connections with a network connection circuit 705 and a communication network (e.g., IP network) coupled to other communication system network elements.

The processors 611, 701 may be any programmable microprocessor, microcomputer or multiple processor chip or chips that can be configured by software instructions (applications) to perform a variety of functions, including the functions of the various embodiments described above. In some devices, multiple processors may be provided, such as one processor dedicated to wireless communication functions and one processor dedicated to running other applications. Typically, software applications may be stored in the internal memory before they are accessed and loaded into the processors 611, 701. The processors 611, 701 may include internal memory sufficient to store the application software instructions. In many devices, the internal memory may be a volatile or nonvolatile memory, such as flash memory, or a mixture of both. For the purposes of this description, a general reference to memory refers to memory accessible by the processors 611, 701 including internal memory or removable memory plugged into the device and memory within the processors 611, 701 themselves.

The foregoing method descriptions and the process flow diagrams are provided merely as illustrative examples and are not intended to require or imply that the steps of the various embodiments must be performed in the order presented. As will be appreciated by one of skill in the art the order of steps in the foregoing embodiments may be performed in any order. Words such as "thereafter," "then," "next," etc. are not intended to limit the order of the steps; these words are simply used to guide the reader through the description of the methods. Further, any reference to claim elements in the singular, for example, using the articles "a," "an" or "the" is not to be construed as limiting the element to the singular.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The hardware used to implement the various illustrative logics, logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Alternatively, some steps or methods may be performed by circuitry that is specific to a given function.

In one or more exemplary aspects, the functions described may be implemented in hardware, software, firmware, or any combination thereof. If implemented in software, the functions may be stored as one or more instructions or code on a non-transitory computer-readable medium or non-transitory processor-readable medium. The steps of a method or algorithm disclosed herein may be embodied in a processor-executable software module and/or processor-executable instructions, which may reside on a non-transitory computer-readable or non-transitory processor-readable storage medium. Non-transitory server-readable, computer-readable or processor-readable storage media may be any storage media that may be accessed by a computer or a processor. By way of example but not limitation, such non-transitory server-readable, computer-readable or processor-readable media may include RAM, ROM, EEPROM, FLASH memory, CD-ROM or other optical disk storage, magnetic disk storage or other magnetic storage devices, or any other medium that may be used to store desired program code in the form of instructions or data structures and that may be accessed by a computer. Disk and disc, as used herein, includes compact disc (CD), laser disc, optical disc, DVD, floppy disk, and Blu-ray disc where disks usually reproduce data magnetically, while discs reproduce data optically with lasers. Combinations of the above are also included within the scope of non-transitory server-readable, computer-readable and processor-readable media. Additionally, the operations of a method or algorithm may reside as one or any combination or set of codes and/or instructions on a non-transitory server-readable, processor-readable medium and/or computer-readable medium, which may be incorporated into a computer program product.

The preceding description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the following claims and the principles and novel features disclosed herein.

What is claimed is:

1. A method of advertising static Internet Protocol (IP) address mapping in an IP network, comprising: determining whether a dynamic IP address event for a media access control (MAC) address associated with a static IP address is received in a lease processor, wherein the dynamic IP address event indicates a current dynamic IP address assigned to the MAC address; determining a type of the received dynamic IP address event for the MAC address associated with the static IP address; determining, in the lease processor, whether the current dynamic IP address conflicts with a last dynamic IP address assigned to the MAC address; sending, from the lease processor, a withdraw notice disassociating the last dynamic IP address and the static IP address in response to determining that the current dynamic IP address conflicts with the last dynamic IP address assigned to the MAC address; and sending, from the lease processor, a notification to update both the static IP address and the current dynamic IP address routing information in one or more route reflectors of the IP network in response to determining that the dynamic IP address event for the MAC address associated with the static IP address is received, wherein the notification is based on the determined type of the received dynamic IP address event for the MAC address associated with the static IP address.

2. The method of claim 1, wherein:
the notification is an announce notification sent from the lease processor to a route injector; and
the updating of the routing information in one or more route reflectors of the IP network comprises a Border Gateway Protocol (BGP) update being sent from the route injector to the one or more route reflectors of the IP network, the BGP update correlating the MAC address, the current dynamic IP address, and the static IP address together in routing tables of the IP network.

3. The method of claim 1, wherein:
the notification is a withdraw notification sent from the lease processor to a route injector; and
the updating of the routing information in one or more route reflectors of the IP network comprises a Border Gateway Protocol (BGP) update being sent from the route injector to the one or more route reflectors of the IP network, the BGP update disassociating the MAC address, the current dynamic IP address, and the static IP address together in routing tables of the IP network.

4. The method of claim 1, wherein the notification is an announce notification, the method further comprising:
determining, in the lease processor, whether a time-to-live for the announce notification has expired; and
sending, from the lease processor, a withdraw notification in response to determining that the time-to-live for the announce notification has expired.

5. The method of claim 4, wherein:
the announce notification correlates the current dynamic IP address and the static IP address together; and
the withdraw notification disassociates the current dynamic IP address and the static IP address.

6. The method of claim 5, wherein the IP network operates according to the Data Over Cable Service Interface Specification (DOCSIS).

7. A device, comprising: a processor configured with processor-executable instructions to perform operations comprising: determining whether a dynamic Internet Protocol (IP) address event for a media access control (MAC) address associated with a static IP address is received, wherein the dynamic IP address event indicates a current dynamic IP address assigned to the MAC address; determining a type of the received dynamic IP address event for the MAC address associated with the static IP address; determining whether the current dynamic IP address conflicts with a last dynamic IP address assigned to the MAC address, sending a withdraw notice disassociating the last dynamic IP address and the static IP address in response to determining that the current dynamic IP address conflicts with the last dynamic IP address assigned to the MAC address; and sending a notification to update both the static IP address and the current dynamic IP address routing information in one or more route reflectors of the IP network in response to determining that the dynamic IP address event for the MAC address associated with the static IP address is received, wherein the notification is based on the determined type of the received dynamic IP address event for the MAC address associated with the static IP address.

8. The device of claim 7, wherein the processor is configured with processor-executable instructions to perform operations such that:
the notification is an announce notification sent to a route injector; and
the updating of the routing information in one or more route reflectors of the IP network comprises a Border Gateway Protocol (BGP) update being sent from the route injector to the one or more route reflectors of the IP network, the BGP update correlating the MAC address, the current dynamic IP address, and the static IP address together in routing tables of the IP network.

9. The device of claim 7, wherein the processor is configured with processor-executable instructions to perform operations such that:
the notification is a withdraw notification sent to a route injector; and
the updating of the routing information in one or more route reflectors of the IP network comprises a Border Gateway Protocol (BGP) update being sent from the route injector to the one or more route reflectors of the IP network, the BGP update disassociating the MAC address, the current dynamic IP address, and the static IP address together in routing tables of the IP network.

10. The device of claim 7, wherein:
the processor is configured with processor-executable instructions to perform operations such that the notification is an announce notification; and
the processor is configured with processor-executable instructions to perform operations further comprising:
determining whether a time-to-live for the announce notification has expired; and
sending a withdraw notification in response to determining that the time-to-live for the announce notification has expired.

11. The device of claim 10, wherein the processor is configured with processor-executable instructions to perform operations such that:
the announce notification correlates the current dynamic IP address and the static IP address together; and
the withdraw notification disassociates the current dynamic IP address and the static IP address.

12. The device of claim 7, wherein the processor is configured with processor-executable instructions to perform operations such that the IP network operates according to the Data Over Cable Service Interface Specification (DOCSIS).

13. A non-transitory processor-readable storage medium having stored thereon processor-executable instructions configured to cause a processor to perform operations, comprising: determining whether a dynamic Internet Protocol (IP) address event for a media access control (MAC) address associated with a static IP address is received, wherein the dynamic IP address event indicates a current dynamic IP address assigned to the MAC address; determining a type of the received dynamic IP address event for the MAC address associated with the static IP address; determining whether the current dynamic IP address conflicts with a last dynamic IP address assigned to the MAC address; sending a withdraw notice disassociating the last dynamic IP address and the static IP address in response to determining that the current dynamic IP address conflicts with the last dynamic IP address assigned to the MAC address; and sending a notification to update both the static IP address and the current dynamic IP address routing information in one or more route reflectors of the IP network in response to determining that the dynamic IP address event for the MAC address associated with the static IP address is received, wherein the notification is based on the determined type of the received dynamic IP address event for the MAC address associated with the static IP address.

14. The non-transitory processor-readable storage medium of claim 13, wherein the stored processor-executable instructions are configured to cause the processor to perform operations such that: the notification is an announce notification sent to a route injector; and the updating of the routing information in one or more route reflectors of the IP network comprises a Border Gateway Protocol (BGP) update being sent from the route injector to the one or more route reflectors of the IP network, the BGP update correlating the MAC address, the current dynamic IP address, and the static IP address together in routing tables of the IP network.

15. The non-transitory processor-readable storage medium of claim 13, wherein the stored processor-executable instructions are configured to cause the processor to perform operations such that: the notification is a withdraw notification sent to a route injector; and the updating of the routing information in one or more route reflectors of the IP network comprises a Border Gateway Protocol (BGP) update being sent from the route injector to the one or more route reflectors of the IP network, the BGP update disassociating the MAC address, the current dynamic IP address, and the static IP address together in routing tables of the IP network.

16. The non-transitory processor-readable storage medium of claim 13, wherein: the stored processor-executable instructions are configured to cause the processor to perform operations such that such that the notification is an announce notification; and the stored processor-executable instructions are configured to cause the processor to perform operations further comprising: determining whether a time-to-live for the announce notification has expired; and sending a withdraw notification in response to determining that the time-to-live for the announce notification has expired.

17. The non-transitory processor-readable storage medium of claim 16, wherein the stored processor-executable instructions are configured to cause the processor to perform operations such that: the announce notification correlates the current dynamic IP address and the static IP address together; and the withdraw notification disassociates the current dynamic IP address and the static IP address.

18. The non-transitory processor-readable storage medium of claim 17, wherein the stored processor-executable instructions are configured to cause the processor to perform operations such that the IP network operates according to the Data Over Cable Service Interface Specification (DOCSIS).

* * * * *